UNITED STATES PATENT OFFICE.

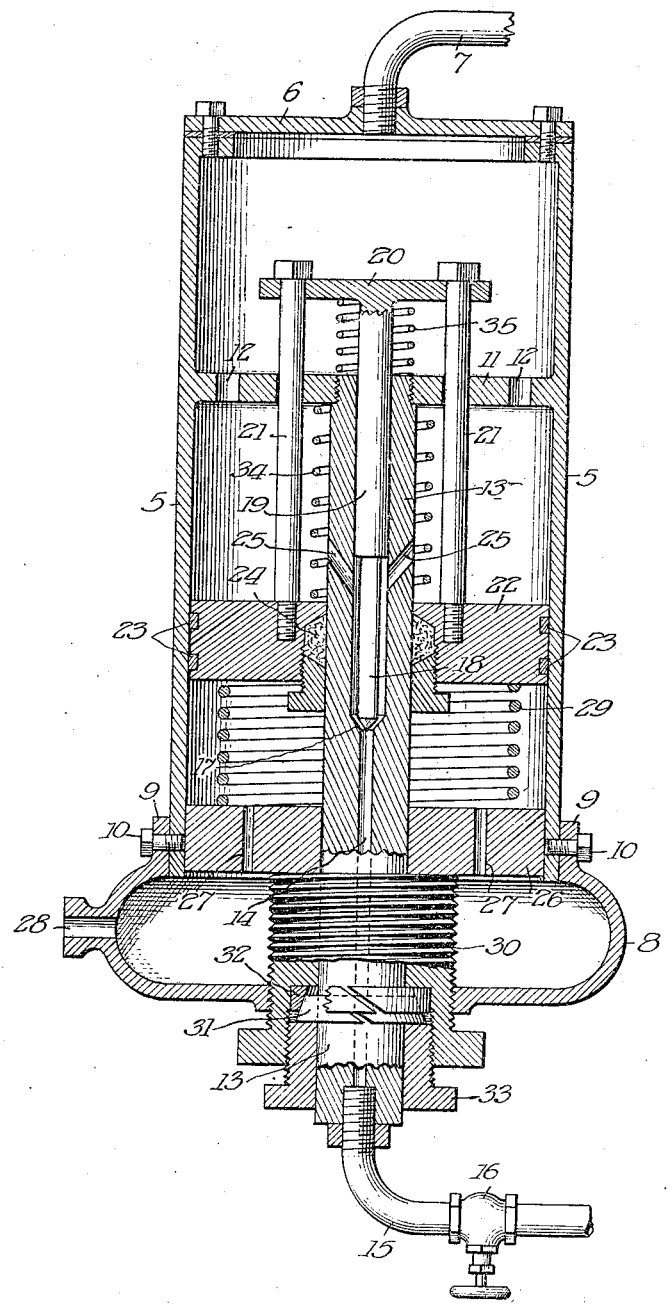

ORVILLE Z. FRAZIER, OF ELKHART, INDIANA, ASSIGNOR OF ONE-HALF TO JAMES F. BOYER, OF ELKHART, INDIANA.

PRESSURE-REGULATOR.

1,281,337.  Specification of Letters Patent.  Patented Oct. 15, 1918.

Application filed May 4, 1918. Serial No. 232,578.

*To all whom it may concern:*

Be it known that I, ORVILLE Z. FRAZIER, a citizen of the United States, residing at Elkhart, in the county of Elkhart and State of Indiana, have invented certain new and useful Improvements in Pressure-Regulators, of which the following is a specification.

This invention relates to pressure regulators of the automatic type designed to regulate the pressure, and render uniform and steady the flow of gas between a source of generation or storage under pressure and the agent of consumption, such as a lighting plant or a gas engine. My present invention has been designed more particularly for use in association with an internal combustion engine using acetylene gas for fuel on which I have filed applications for Letters Patent, Serial No. 208,340, filed December 22, 1917, and Serial No. 211,062, filed January 9, 1918; but the same is obviously capable of being used advantageously in other relations wherever an automatic gas pressure regulator is necessary or desirable.

The main object of the invention is to provide an improved pressure regulator of simple and inexpensive construction that shall be reliable and sensitive in its automatic control of the gas flowing therethrough, capable of easy adjustment without disassembling to any desired pressure, and that shall insure a steady and uniform flow of gas regardless of variations and fluctuations in the pressure at the source. This and other objects and advantages which will be apparent from the following description I attain by the construction illustrated in the accompanying drawing in which the figure is an axial section with parts broken out, of the complete device.

Referring to the drawing, 5 designates a cylindrical casing having at one end a gas-tight cover 6 through which is led an eduction pipe 7, and at its other end a hollow cap or closure 8 formed with an annular flange 9 that is secured to the adjacent end of the cylindrical body 5 as by screws 10.

Disposed transversely of the cylindrical body 5, and secured to or integral with the walls thereof, is a bridge member 11 formed with transverse passages 12 that connect the spaces on opposite sides thereof. Secured to and centrally of the bridge member 11 is a gas inlet pipe 13 that extends through the end closure 8 and is formed with an axial duct 14 extending therethrough and communicating at one end with the gas supply pipe 15 leading from a gas supply tank or generator, the pipe 15 being preferably equipped with a shut-off valve 16.

The inlet duct 14 approximately midway of its length is formed with a valve seat 17, with which coöperates a needle valve 18, the stem 19 of which has a relatively long bearing in the upper portion of the inlet duct 14, which is somewhat enlarged above the valve seat 17. On the upper end of the valve stem 19 is a cross-bar 20 that is connected by rods 21 passing through and guided in the bridge member 11 to a piston 22 that has a gas-tight fit by means of piston rings 23 with the cylindrical wall 5 of the casing, and also forms a gas-tight fit with the gas inlet pipe 13 by means of a packed joint 24. The space within the casing above the piston 21 constitutes a pressure chamber, of which the piston 21 forms a movable end wall; and the gas inlet duct 14 communicates with this pressure chamber by one or more lateral branch ducts 25.

Slidably fitting the cylinder 5 of the casing at or near its lower end is a second piston 26, through which is formed one or more vent passages 27 opening into the hollow cap 8, which latter in turn is open to the atmosphere at 28. Confined endwise between the pistons 21 and 26 is a compression spring 29 that acts in opposition to the gas pressure in the pressure chamber above the piston 21. The piston 26 is, in turn, backed by a hollow screw 30 that is threaded through the cap 8 and at its inner end abuts against the piston 26. In order to lock the screw 30 securely against accidental turning, the outer end of said screw is chambered to receive male and female split rings 31 and 32, respectively, that are forced into engagement by a gland 33 threaded into the chamber of the adjusting screw 30.

Between the piston 21 and the bridge member 11, and surrounding the pipe 13 is a compression spring 34 which acts in opposition to the spring 29 and limits the upward movement of the piston 21 when the pressure is off. Between the bridge member 11 and the cross-bar 20 is preferably inserted a compression spring 35 which serves to steady the tension of spring 34, but may be omitted if desired.

The operation of the device will be readily apparent from the foregoing description of its structure. Gas from the supply tank or generator flows through the pipe 15 and the duct 14 past the needle valve 18 and through the branch ducts 25 into the pressure chamber, and thence through the pipe 7 to the point of use. When the pressure increases the piston 22 is forced downwardly against the resistance of spring 29, carrying the valve 18 with it and thereby throttling the gas and reducing its pressure. On the other hand, when the pressure of the inflowing gas falls, its pressure on the piston 22 is reduced, and the spring 29 causes said piston to rise, thereby enlarging the area of the passage at the needle valve seat, and automatically restoring the pressure in the pressure chamber. By employing a throttle valve of the needle valve type, and giving to this valve a relatively long bearing above the valve seat, the movement of the valve is limited strictly to a movement in the axial direction, and a very fine and uniform throttling effect is obtained. By manipulating the adjusting nut 30, the tension of the spring 29 is increased or decreased, thereby varying the pressure of the gas delivered by the regulator. By means of the expansion rings 31 and 32 and the follower gland 33 the adjusting nut 30 is frictionally locked to the rigid inlet pipe 13, so as to prevent accidental yielding of the abutment piston 26 with consequent accidental variations in the pressure. The vent openings 27 and 28 obviously prevent alternate compression and rarefaction of the air in the space between pistons 22 and 26 under the fluctuations of piston 22, and maintain atmospheric pressure at all times on the lower side of the latter.

It will be manifest to those skilled in the art that the structure herein shown and described may be modified in respect to details without involving any change in its substantial character and principle of operation. Hence, I do not limit the invention to the exact structure shown for purposes of illustration, but reserve all such variations and modifications as fall within the scope of the appended claims.

I claim:—

1. In a pressure regulator, the combination of a casing, a piston therein forming a movable wall of a pressure chamber, a spring acting on said piston in opposition to the pressure in said chamber, a pipe extending through said piston and formed with an axial gas inlet duct having a valve-seat and a lateral branch duct beyond said valve-seat leading into said chamber, and a needle-valve slidably mounted in said axial duct and coöperating with said valve-seat, said needle valve being connected to and actuated by said piston.

2. In a pressure regulator, the combination of a cylindrical casing, a piston therein forming a movable end wall of a pressure chamber, a spring acting on said piston in opposition to the pressure in said chamber, a bridge member connecting the side walls of said chamber, a pipe extending through said piston and connected at its inner end to said bridge member, said pipe having an axial gas inlet duct formed with a valve-seat and a lateral branch duct leading into said pressure chamber between said piston and said bridge member, a needle-valve coöperating with said valve seat and having a stem slidably mounted and guided in said axial duct beyond said lateral branch duct, and actuating connections between said piston and valve stem.

3. In a pressure regulator, the combination of a cylindrical casing, a piston therein forming a movable end wall of a pressure chamber, a spring acting on said piston in opposition to the pressure in said chamber, a bridge member connecting the side walls of said chamber, a pipe extending through said piston and connected at its inner end to said bridge member, said pipe having an axial gas inlet duct formed with a valve-seat and a lateral branch duct leading into said pressure chamber between said piston and said bridge member, a needle-valve coöperating with said valve-seat and having a stem slidably mounted and guided in said axial duct beyond said lateral branch duct, a cross-bar on the outer end of said valve-stem, and rods connecting said cross-bar and piston and passing through and guided by said bridge member.

4. In a pressure regulator, the combination of a cylindrical casing, a piston therein forming a movable end wall of a pressure chamber, a spring acting on said piston in opposition to the pressure in said chamber, a bridge member connecting the side walls of said chamber, a pipe extending through said piston and connected at its inner end to said bridge member, said pipe having an axial gas inlet duct formed with a valve-seat and a lateral branch duct leading into said pressure chamber between said piston and said bridge member, a compression spring between said bridge member and piston opposing said first-named spring, a needle-valve coöperating with said valve-seat and having a stem slidably mounted and guided in said axial duct beyond said lateral branch duct, and actuating connections between said piston and valve stem.

5. In a pressure regulator, the combination of a cylindrical casing, a piston therein forming a movable end wall of a pressure chamber, a spring acting on said piston in opposition to the pressure in said chamber, a bridge member connecting the side walls of said chamber, a pipe extending through said piston and connected at its inner end to said bridge member, said pipe having an axial gas inlet duct formed with a valve-seat and a lateral branch duct leading into said pressure chamber between said piston and said bridge member, a compression spring between said bridge member and piston opposing said first-named spring, a needle-valve coöperating with said valve-seat and having a stem slidably mounted and guided in said axial duct beyond said lateral branch duct, a cross-bar on the outer end of said valve stem, a compression spring between said cross-bar and bridge member, and rods connecting said cross-bar and piston and passing through and guided by said bridge member.

6. In a pressure regulator, the combination of a casing, a piston therein forming a movable wall of a pressure chamber, a second piston in said casing forming a spring-abutment member and having a vent opening formed therethrough, a gas inlet pipe extending through said pistons into said chamber, a valve connected to and actuated by said first-named piston controlling the inflow of gas through said pipe, a compression spring confined between said pistons, and an adjusting screw threaded through an end wall of said casing and bearing against said second piston whereby, through the latter, to vary the force of said spring.

7. In a pressure regulator, the combination of a casing, a piston therein forming a movable wall of a pressure chamber, a second piston in said casing forming a spring-abutment member and formed with a vent opening, a gas inlet pipe extending through said pistons into said chamber, a valve connected to and actuated by said first-named piston controlling the inflow of gas through said pipe, a compression spring surrounding said pipe and confined between said pistons, a hollow adjusting screw surrounding said pipe and threaded through an end wall of said casing and bearing at its inner end against said second piston, and means for locking said adjusting screw in any set position.

O. Z. FRAZIER.

Copies of this patent may be obtained for five cents each, by addressing the "Commissioner of Patents, Washington, D. C."